United States Patent
Sambongi (10) Patent No.: US 8,692,709 B2
(45) Date of Patent: Apr. 8, 2014

(54) POSITIONING APPARATUS, POSITIONING METHOD, AND STORAGE MEDIUM FOR MEASURING POSITION USING BOTH AUTONOMOUS NAVIGATION AND GPS

(75) Inventor: Masao Sambongi, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 137 days.

(21) Appl. No.: 13/232,591

(22) Filed: Sep. 14, 2011

(65) Prior Publication Data

US 2012/0062414 A1   Mar. 15, 2012

(30) Foreign Application Priority Data

Sep. 15, 2010  (JP) ................................. 2010-206246
Nov. 8, 2010   (JP) ................................. 2010-249325

(51) Int. Cl.
   G01S 19/49    (2010.01)
   G01S 19/48    (2010.01)
   G01C 21/12    (2006.01)
   G01C 21/16    (2006.01)

(52) U.S. Cl.
   CPC ............. G01S 19/49 (2013.01); G01S 19/48 (2013.01); G01C 21/165 (2013.01)
   USPC ................ 342/357.32; 342/357.31; 701/472

(58) Field of Classification Search
   CPC ........ G01S 19/48; G01S 19/49; G01C 21/165
   USPC ............... 342/357.32, 357.3, 357.74, 357.31
   See application file for complete search history.

(56) References Cited

U.S. PATENT DOCUMENTS 5,293,318 A *  3/1994  Fukushima ................... 701/446
5,422,639 A *  6/1995  Kobayashi et al. ........... 340/988
5,448,773 A *  9/1995  McBurney et al. ........ 455/343.6
5,598,166 A    1/1997  Ishikawa et al.
6,167,346 A * 12/2000  Fukawa ........................ 701/410

(Continued)

FOREIGN PATENT DOCUMENTS

JP    6-094471 A    4/1994
JP    6-221861 A    8/1994

(Continued)

OTHER PUBLICATIONS

Kao. "Integration of GPS and Dead Reckoning Navigation Systems," IEEE VINS Conference 1991, pp. 635-643.*

(Continued)

Primary Examiner — Gregory C Issing
(74) Attorney, Agent, or Firm — Holtz, Holtz, Goodman & Chick, PC (57) ABSTRACT

A positioning apparatus including: a first positioning unit which intermittently receives signals from satellites and carries out a first position measurement; a second positioning unit which carries out a second position measurement by adding information of a moving direction and a moving amount to positional information of a reference position; a positioning control unit which obtains positional information corresponding to positions along a movement path by the first position measurement and the second position measurement; a reference position updating unit which updates the positional information of the reference position based on a result of the first position measurement; a distance calculating unit which calculates a distance between two positions, i.e., between the reference position and a position obtained by the second position measurement; and a positioning timing control unit which controls timing to carry out the first position measurement based on the distance.

11 Claims, 7 Drawing Sheets

(56) References Cited

U.S. PATENT DOCUMENTS

| | | | |
|---|---|---|---|
| 6,549,844 B1 * | 4/2003 | Egberts | 701/466 |
| 6,559,794 B1 * | 5/2003 | Nakajima et al. | 342/357.31 |
| 2005/0049787 A1 * | 3/2005 | Cho | 701/216 |
| 2005/0280576 A1 * | 12/2005 | Shemesh et al. | 342/357.1 |
| 2009/0098880 A1 * | 4/2009 | Lindquist | 455/456.1 |
| 2009/0189810 A1 | 7/2009 | Murray | |

FOREIGN PATENT DOCUMENTS

| | | | |
|---|---|---|---|
| JP | 8-271607 A | 10/1996 | |
| JP | 11-083529 A | 3/1999 | |
| JP | 2008-122092 A | 5/2008 | |
| JP | 2009-092506 A | 4/2009 | |
| JP | 2010-032289 A | 2/2010 | |
| JP | 2010-038799 A | 2/2010 | |
| JP | 2010032289 A | * | 2/2010 |

OTHER PUBLICATIONS

Japanese Office Action dated Jan. 22, 2013 (and English translation thereof) in counterpart Japanese Application No. 2010-249325.

Chinese Office Action dated May 9, 2013 (and English translation thereof) in counterpart Chinese Application No. 201110271332.X.

* cited by examiner

POSITIONING APPARATUS, POSITIONING METHOD, AND STORAGE MEDIUM FOR MEASURING POSITION USING BOTH AUTONOMOUS NAVIGATION AND GPS

BACKGROUND OF THE INVENTION

1. Field of the Invention

The present invention relates to a positioning apparatus, a positioning method, and a storage medium for obtaining positional information of each position on a movement path.

2. Description of Related Art

Conventionally, there exists a positioning apparatus which obtains positional information of each position on a movement path using both a positioning function utilizing a Global Positioning System (GPS) and a positioning function using an autonomous navigation sensor.

Hereinafter, a position measurement using the GPS is called a GPS measurement, and a position measurement using the autonomous navigation sensor is called an autonomous navigation position measurement.

In the autonomous navigation position measurement, positional information related to a measured position is calculated in such a way that an autonomous navigation sensor such as an acceleration sensor and a direction sensor continuously measures a moving vector which represents a relative moving direction and a moving amount, and in such a way that information of the moving vector is added to positional information of a preset reference position.

The autonomous navigation position measurement has such a property that, if the positioning operation is repeatedly executed, positioning errors are accumulated.

Therefore, when carrying out the autonomous navigation position measurement with a positioning apparatus, it is necessary to obtain relatively precise positional information by the GPS measurement, for example and to reset the obtained positional information as a new reference position before the positioning errors are increased.

As a conventional technique relating to the invention of the present application, Japanese Patent Application Laid-Open No. H06-094471 discloses a configuration that performs both a positioning operation by means of an autonomous navigation processing unit and a positioning operation by means of the GPS.

Japanese Patent Application Laid-Open No. H06-094471 discloses a configuration where, if a distance between a measurement result obtained by the autonomous navigation processing unit and a measurement result obtained by the GPS is equal to or more than a predetermined value, a coordinate of a starting position of the autonomous navigation processing unit is corrected based on the measurement result obtained by the GPS.

SUMMARY OF THE INVENTION

An object of the present invention is to provide a positioning apparatus, a positioning method, and a storage medium capable of appropriately determining a timing to carry out a GPS measurement when positional data of each position on a movement path is obtained using both an autonomous navigation position measurement and an intermittent GPS measurement.

According to a first aspect of the present invention, there is provided a positioning apparatus including: a first positioning unit which intermittently receives signals from a plurality of positioning satellites and carries out a first position measurement; a second positioning unit which carries out a second position measurement by continuously measuring a moving direction and a moving amount of a user and by adding information of the moving direction and the moving amount to positional information of a reference position; a positioning control unit which obtains positional information corresponding to positions along a movement path by the first position measurement and the second position measurement; a reference position updating unit which updates the positional information of the reference position based on a result of the first position measurement when the first position measurement is carried out; a distance calculating unit which calculates a distance between two positions, i.e., between the reference position and a position obtained by the second position measurement; and a positioning timing control unit which controls timing to carry out the first position measurement based on the distance between the two positions.

According to a second aspect of the present invention, there is provided a positioning method for obtaining positional information corresponding to positions along a movement path by using a first positioning unit and a second positioning unit, the first positioning unit intermittently receiving signals from a plurality of positioning satellites and carrying out a first position measurement; and the second positioning unit carrying out a second position measurement by continuously measuring a moving direction and a moving amount of a user and by adding information of the moving direction and the moving amount to positional information of a reference position; the method including: (a) obtaining the positional information corresponding to the positions along the movement path by the first position measurement and the second position measurement; (b) updating the positional information of the reference position based on a result of the first position measurement when the first position measurement is carried out; (c) calculating a distance between two positions, i.e., between the reference position and a position obtained by the second position measurement; and (d) controlling timing to carry out the first position measurement based on the distance between the two positions.

According to a third aspect of the present invention, there is provided a computer readable storage medium having recorded thereon a computer program for controlling a computer which communicates with a first positioning unit and a second positioning unit, the first positioning unit intermittently receiving signals from a plurality of positioning satellites and carrying out a first position measurement; and the second positioning unit carrying out a second position measurement by continuously measuring a moving direction and a moving amount of a user and by adding information of the moving direction and the moving amount to positional information of a reference position; wherein the program controls the computer to function as: a positioning control unit which obtains positional information corresponding to positions along a movement path by the first position measurement and the second position measurement; a reference position updating unit which updates the positional information of the reference position based on a result of the first position measurement when the first position measurement is carried out; a distance calculating unit which calculates a distance between two positions, i.e., between the reference position and a position obtained by the second position measurement; and a positioning timing control unit which controls timing to carry out the first position measurement based on the distance between the two positions.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Embodiments of the present invention will be described below with reference to the drawings.

First Embodiment

Figure 1:
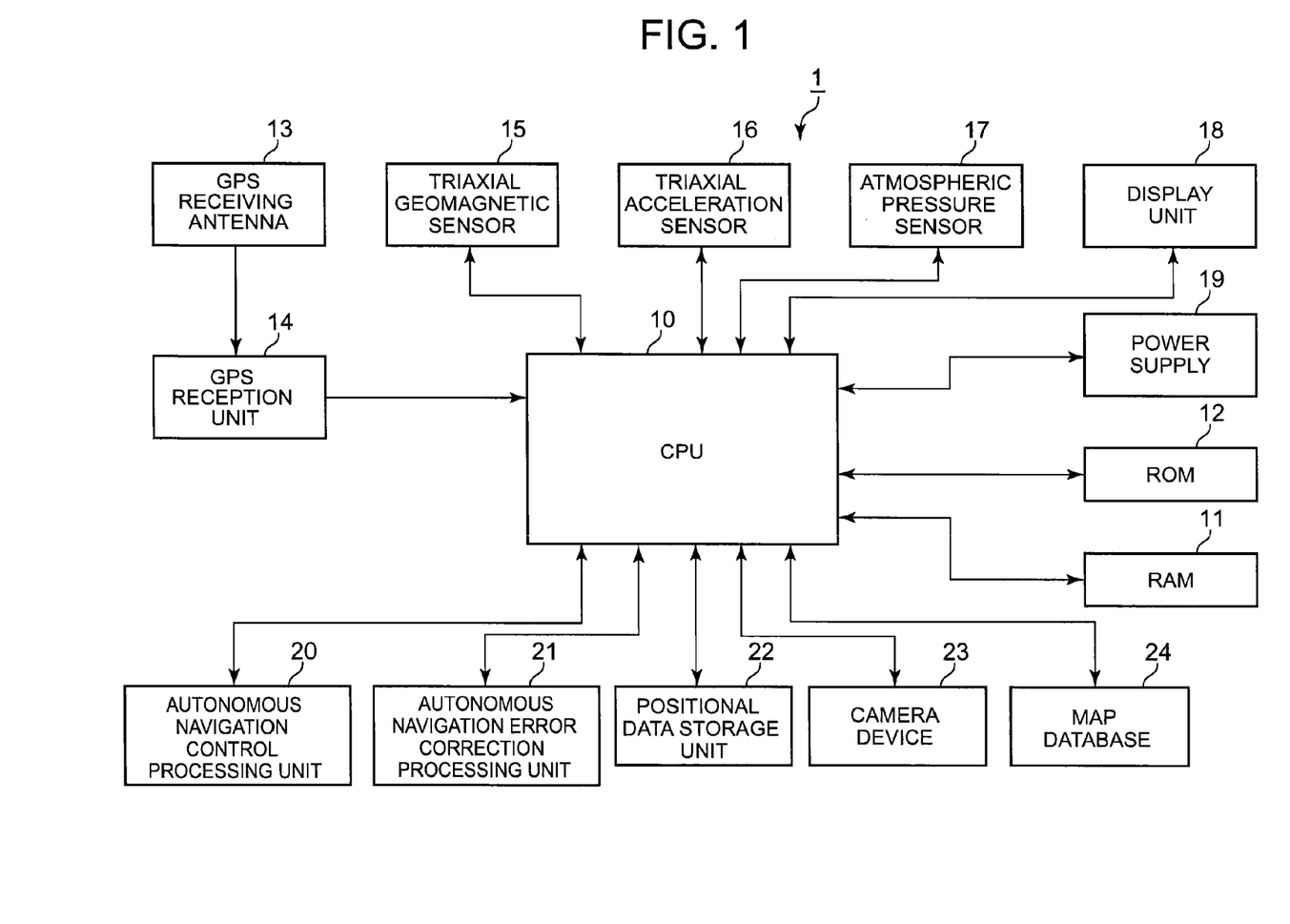
FIG. 1 is a block diagram illustrating a configuration of an entire navigation apparatus according to a first embodiment of the present invention.

FIG. 1 is a block diagram illustrating a configuration of an entire navigation apparatus according to a first embodiment of the present invention.

A navigation apparatus (positioning apparatus) 1 of this embodiment measures a position during movement and stores positional data of each position on a movement path.

The navigation apparatus 1 can measure a position of a walking user by the autonomous navigation.

As illustrated in FIG. 1, the navigation apparatus 1 includes a CPU 10 which controls an entire system, a random access memory (RAM) 11 which provides the CPU 10 with a working memory space, a read-only memory (ROM) 12 in which control programs and control data executed by the CPU 10 are stored, a GPS receiving antenna 13 and a GPS reception unit 14 which receive data transmitted from GPS satellites, a triaxial geomagnetic sensor 15 and a triaxial acceleration sensor 16 which are autonomous navigation sensors, an atmospheric pressure sensor 17 which detects a movement in a height direction, a display unit 18 which displays various kinds of information and images, a power supply 19 which supplies operation voltage to various members, an autonomous navigation control processing unit 20 which computes for an autonomous navigation position measurement based on measured data obtained by the autonomous navigation sensors (15 and 16), an autonomous navigation error correction processing unit 21 as a correcting unit which carries out correction computation of positional data obtained by the autonomous navigation control processing unit 20, a positional data storage unit 22 in which a series of positional data sets corresponding to positions along a movement path is stored, a camera device 23 for electronically storing an image by a user's shooting operation, a map database 24 in which map image data of each position is registered, and the like.

Of the above-described configurations, the GPS receiving antenna 13, the GPS reception unit 14, and the CPU 10 constitute a first positioning unit and a precision level obtaining unit.

The triaxial geomagnetic sensor 15, the triaxial acceleration sensor 16, and the autonomous navigation control processing unit 20 constitute a second positioning unit.

The GPS reception unit 14 demodulates signals received through the GPS receiving antenna 13 based on an operation command from the CPU 10.

The GPS reception unit 14 carries out computation processing based on these demodulation signals, and outputs computed data to the CPU 10 in a preset format.

A format in conformity with a standard of NMEA-0183 (National Marine Electronics Association), for example, is included in the format which can be output from the GPS reception unit 14.

The triaxial geomagnetic sensor 15, which is a sensor using a magnetoresistive element, three-dimensionally measures a geomagnetic orientation and outputs the same to the CPU 10.

The triaxial acceleration sensor 16 measures accelerations in three axial directions, respectively, and outputs a measured acceleration to the CPU 10.

The autonomous navigation control processing unit 20 assists computation processing of the CPU 10 for carrying out the autonomous navigation position measurement.

The autonomous navigation control processing unit 20 obtains measurement data from the triaxial geomagnetic sensor 15 and the triaxial acceleration sensor 16 through the CPU 10 with a predetermined sampling period.

The autonomous navigation control processing unit 20 calculates a moving direction and a moving amount of the navigation apparatus 1 from the measurement data. Vector data composed of data of the calculated moving direction and moving amount is added to the positional data of a reference position supplied from the CPU 10. Thereby positional data of a position is obtained to be supplied to the CPU 10.

In detail, the autonomous navigation control processing unit 20 calculates a moving direction from an output fluctuation pattern which is peculiar to walking motion appearing on output from the triaxial acceleration sensor 16.

More specifically, when a user walks, the user's body largely inclines back and forth and slightly rolls laterally.

At this time, if the navigation apparatus 1 is attached to the user's body, the output fluctuation pattern appears on the output from the triaxial acceleration sensor 16 since the navigation apparatus 1 also moves in the same manner as the user's body.

The autonomous navigation control processing unit 20 can calculate which direction of the navigation apparatus 1 the user is walking in by analyzing this output fluctuation pattern.

The autonomous navigation control processing unit 20 can determine which direction of the navigation apparatus 1 a gravity direction is in, based on output from the triaxial acceleration sensor 16.

Further, the autonomous navigation control processing unit 20 can calculate which direction of the navigation apparatus 1 a magnetic north is in, based on output from the triaxial geomagnetic sensor 15.

From these results, the autonomous navigation control processing unit 20 can obtain a moving direction of the user as an azimuth.

The autonomous navigation control processing unit 20 detects vertical motion of the navigation apparatus 1 from the output from the triaxial acceleration sensor 16, and counts the number of steps based on the detected the vertical motion.

The autonomous navigation control processing unit 20 multiplies the number of steps by preset stride data, thereby calculating a walking moving amount.

Therefore, generally, the moving amount includes a positioning error by a certain ratio.

In addition to the calculation of the moving direction and the moving amount, the autonomous navigation control processing unit 20 also calculates a moving amount in the height direction from variation of an output value of the atmospheric pressure sensor 17.

The autonomous navigation error correction processing unit 21 is an arithmetical unit for assisting computation processing of the CPU 10.

The autonomous navigation error correction processing unit 21 corrects a series of positional data sets which is calculated by the autonomous navigation control processing unit 20 and stored in the positional data storage unit 22, to more precise positional data.

More specifically, when intermittent GPS measurement is carried out, the autonomous navigation error correction processing unit 21 corrects the series of positional data sets based on positional data which is obtained by this GPS measurement.

A specific example of this correction processing will be described in detail later.

The positional data storage unit 22 includes a RAM or a nonvolatile memory, for example. In the positional data storage unit 22, positional data sets obtained by the positioning operation during movement of the system are sequentially registered.

When the positional data is stored, an index number "No." representing its obtained order, a correction flag representing whether the positional data is already corrected, and the like, are added to the positional data.

Stored in the ROM 12 is a positioning control processing program for obtaining positional data of each position on a movement path using both the autonomous navigation position measurement and the GPS measurement.

The CPU 10 which executes this positioning control processing constitutes a positioning control unit.

This program can be stored in the ROM 12, or in a mobile storage medium such as an optical disk which can be read by the CPU 10 through a data reader, or in a nonvolatile memory such as a flash memory.

Such a program can be downloaded to the navigation apparatus 1 through a communication line using a carrier wave as a medium.

Next, positioning control processing according to the first embodiment which is executed in the navigation apparatus 1 having the above-described configuration will be described.

[Positioning Control Processing]

Figure 2:
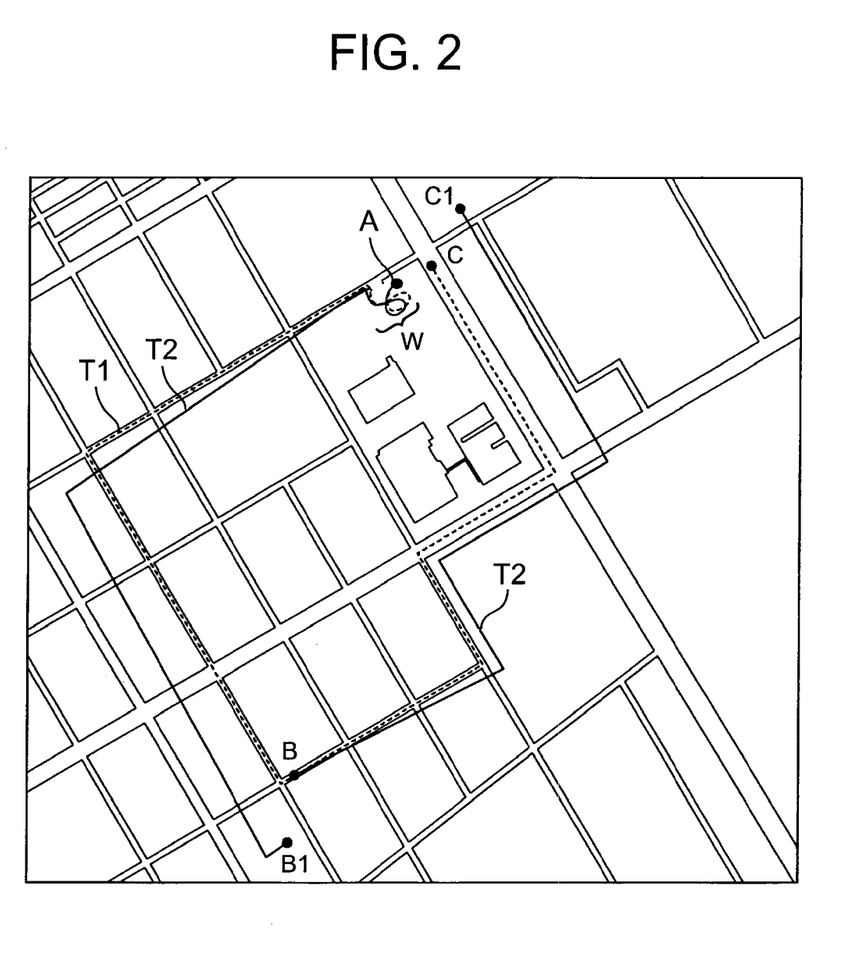
FIG. 2 is an explanatory diagram illustrating an example of a positioning result of positioning control processing of the first embodiment.

FIG. 2 is an explanatory diagram illustrating an example of a positioning result of the positioning control processing according to the first embodiment.

In FIG. 2, when a user moves from a position A to a position C, a broken line indicates an actual movement path T1, and a solid line indicates a locus T2 of a result of an autonomous navigation position measurement.

In the positioning control processing of the first embodiment, the CPU 10 first executes the GPS measurement when the processing is started, and the CPU 10 continuously executes the autonomous navigation position measurement with this position set as a first reference position.

In an example of FIG. 2, the CPU 10 carries out the GPS measurement at a start position A, and sets this position A as a first reference position.

The CPU carries out a subsequent autonomous navigation position measurement, and obtains a series of positional data sets of the locus T2 (locus T2 from the position A to a position B1).

Next, in the positioning control processing of the first embodiment, the CPU 10 carries out an intermittent GPS measurement based on elapsed time as a basic control operation.

When a GPS measurement is newly carried out, the CPU 10 registers a position where the GPS measurement is carried out as a second reference position.

The CPU 10 corrects a series of positional data sets obtained by the autonomous navigation position measurement which is performed from the first reference position to the second reference position, based on the first reference position and the second reference position.

After the correction processing, the position which is registered as the second reference position is newly registered as a first reference position by the CPU 10, and the CPU 10 continues the subsequent autonomous navigation position measurement.

In the example illustrated in FIG. 2, during the movement from the position B to a position C, elapsed time reaches a predetermined time, and the GPS measurement is carried out at the position C.

In this moving process, the position B is set as the first reference position.

In the positioning control processing of the first embodiment, while the autonomous navigation position measurement is continuously executed, the CPU 10 calculates a distance between two positions, i.e., between the first reference position and a presently-measured position.

The CPU 10 uses data obtained by the GPS measurement as positional data of the first reference position, and uses data obtained by the autonomous navigation position measurement as positional data of the presently-measured position.

The distance between two positions is not necessarily a moving distance between two positions along a movement path That is, any distance may be used as the distance as long as the lengths of the distances can be compared with each other For example, a straight-line distance between two positions can also be used.

Based on a series of the distances between two positions obtained by the series of autonomous navigation position measurements, the CPU 10 determines whether the position obtained by the autonomous navigation position measurement is moving away from or toward the first reference position.

If it is determined that the measured position is moving toward the first reference position, the CPU 10 executes an intermittent GPS measurement even if the elapsed time does not reach the predetermined time.

For example, in a moving process from the position A to position B in FIG. 2, the CPU 10 calculates a distance between two positions, i.e., between the first reference position A and a position (each position of locus T2) obtained by the autonomous navigation position measurement whenever the autonomous navigation position measurement is carried out.

At position B1, if the distance between two positions is smaller than the distance obtained by the last measurement, the CPU 10 determines that the measured position is moving toward the first reference position A.

Then, the CPU 10 carries out the GPS measurement, and obtains positional data of the position B.

If it is determined that the measured position is moving toward the first reference position and the GPS measurement is carried out, the CPU 10 carries out the processing for correcting the positional data and the processing for updating the first reference position.

In the example in FIG. 2, for example, the position B is set as a second reference position by the GPS measurement at the position B, and the CPU 10 carries out the processing for correcting a series of positional data sets of the locus T2 from the position A to the position B1.

Thereafter, the CPU 10 newly registers the position B as a first reference position, and continues the autonomous navigation position measurement.

A criterion for determining whether the position obtained by the autonomous navigation position measurement is moving toward the first reference position is set as follows That is, a maximum value of a series of distances between two positions calculated based on a series of autonomous navigation position measurements, and a distance between two positions calculated most recently, are compared with each other. If a difference therebetween exceeds a predetermined threshold value (e.g., 5 m), it is determined that the position obtained by the autonomous navigation position measurement is moving toward the first reference position.

This criterion for the determination is not limited to the above-described example and various modifications can be made.

For example, a distance between two positions calculated last time and a distance between two positions calculated most recently may be compared with each other. If the latter distance is shorter, it may be determined that the position obtained by the autonomous navigation position measurement is moving toward the first reference position.

Alternatively, three distances between two positions respectively calculated most recently, last time, and the time before last are compared with one another. If the distances become shorter in order of the time before last, last time, and most recently, it may be determined that the position obtained by the autonomous navigation position measurement is moving toward the first reference position.

Alternatively, a maximum value of a distance between two positions and a distance between two positions calculated most recently may be compared with each other. If a ratio of the distance between two positions calculated most recently to the maximum value is smaller than a predetermined threshold value (95%), it may be determined that the position obtained by the autonomous navigation position measurement is moving toward the first reference position.

There is an exception to the control processing of the GPS measurement based on the distance between two positions.

That is, when a position obtained by the autonomous navigation position measurement is located within a predetermined distance range (e.g., within 20 m) from the first reference position, control processing for carrying out the GPS measurement is not performed, even if the measured position is moving toward the first reference position.

The predetermined distance range is set to such a distance (e.g., 20 m) that a position measurement precision of the autonomous navigation position measurement does not substantially exceed a permissible level.

For example, in movements within a range W illustrated in FIG. 2, there is a movement of traveling toward the first reference position A However, since the measured position is located within the predetermined distance range from the first reference position A, the GPS measurement is not carried out.

Even if the GPS measurement based on the distance between two positions is carried out, the CPU 10 does not use a result of the GPS measurement in the following case; that is, in a case where the CPU 10 obtains precision level representing precision of a positioning result and the precision is lower than a predetermined value.

Here, the CPU 10 utilizes Dilution of Precision (DOP) value or GNSS Pseudorange Error Statistics (GST) as precision level.

[Correction Processing]

Processing for correcting a series of positional data sets obtained by the above-described autonomous navigation position measurement will be described next.

Figure 3:
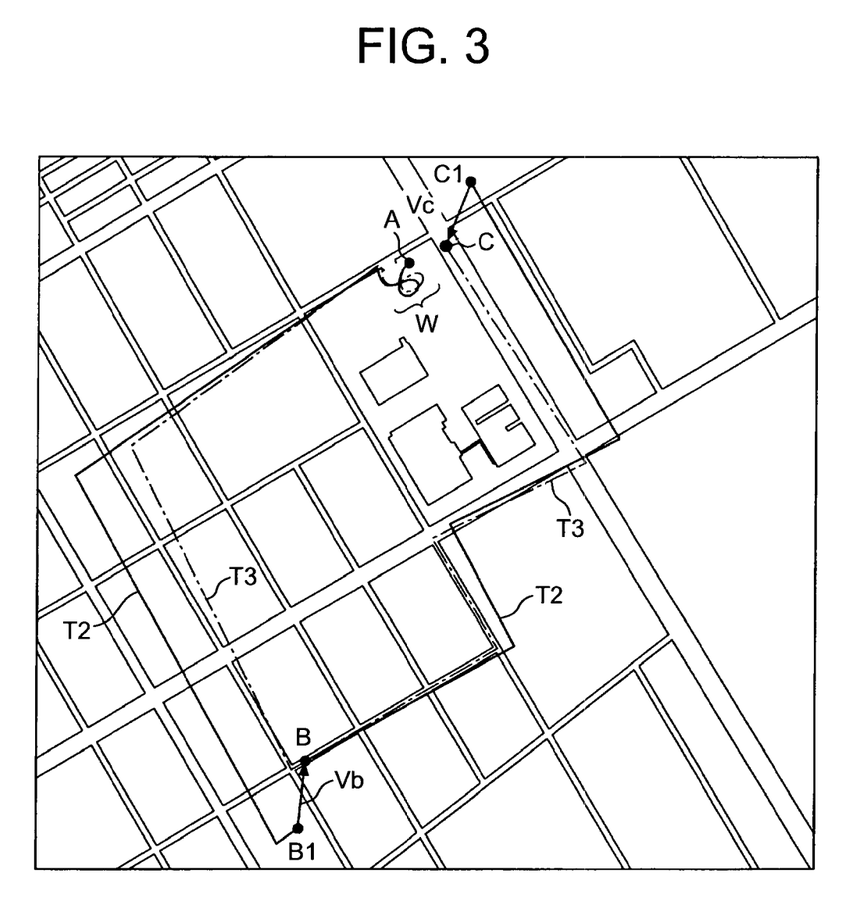
FIG. 3 is an explanatory diagram illustrating contents of processing for correcting a series of positional data sets obtained by an autonomous navigation position measurement.

FIG. 3 is an explanatory diagram illustrating contents of processing for correcting a series of positional data sets obtained by the autonomous navigation position measurement.

In FIG. 3, a solid line indicates a locus T2 of a series of positional data sets obtained by the autonomous navigation position measurement, and a dashed line indicates a locus T3 of positional data after it is corrected.

This correction processing can remove a given offset error included in a moving direction measured by the autonomous navigation position measurement, and a uniform positioning error included in a measured value of a moving amount in the autonomous navigation position measurement.

As illustrated with the locus T2 from the position A to the position B1 in FIG. 3, a series of positional data sets before being corrected is obtained in such a manner that after positional data is given by the GPS measurement at the first reference position A, information of a moving vector measured by the autonomous navigation position measurement is added to the positional data of the first reference position A.

At a second reference position B where an intermittent GPS measurement is carried out, a difference of vector Vb is generated between a result (position B) of the GPS measurement and a result (position B1) of the autonomous navigation position measurement.

The autonomous navigation error correction processing unit 21 uniformly scales up or down and rotates the locus T2 indicated by a series of positional data sets obtained by the autonomous navigation position measurement such that a first reference position A which is one end of the locus T2 is fixed and that the other end B1 is superposed on a position of the second reference position B where the GPS measurement is performed.

The autonomous navigation error correction processing unit 21 sets, as positional data after correction, positional data of each measured position shifted on a locus T3 after this change.

That is, the autonomous navigation error correction processing unit 21 carries out computation processing which changes the scaling relation, and obtains a series of positional data sets after correction.

With respect to a series of positional data sets from the position B to a position C1 in FIG. 3, the position B is set as a first reference position and then, the position C where the intermittent GPS measurement is carried out is set as a second reference position, and a difference vector Vc is calculated.

The autonomous navigation error correction processing unit 21 carries out the similar computation processing, and positional data after correction indicated by the locus T3 from the position B to the position C is obtained.

Figure 4:
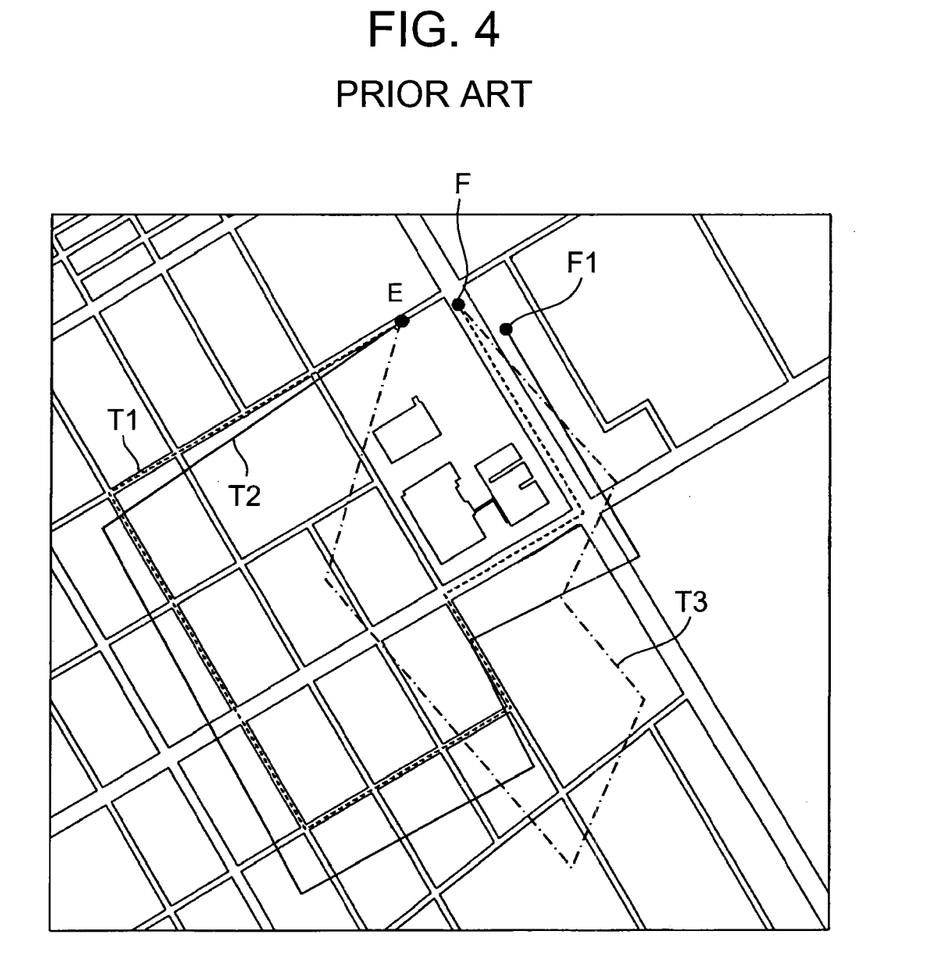
FIG. 4 illustrates a conventional technique and is an explanatory diagram illustrating an example of a series of positional data sets obtained by the autonomous navigation position measurement which cannot carryout precise correction processing.

FIG. 4 illustrates a conventional technique and is an explanatory diagram illustrating an example of a series of positional data sets obtained by an autonomous navigation position measurement which cannot carry out precise correction processing.

In FIG. 4, when the measured position moves from a position E to a point F, a broken line indicates the actual movement path T1, and a solid line indicates a locus T2 of a result of the autonomous navigation position measurement.

Further, a dashed line indicates a locus T3 of positional data after correction.

In the correction processing according to the conventional technique, as illustrated in FIG. 4, for example, the measured position is once separated far away from the first reference position E Then, the measured position again comes close to the first reference position E, when a time to carry out the GPS measurement comes, and the GPS measurement is carried out.

When a second reference position F is set based on a position result of the GPS measurement, a difference of vector Vf (vector between positions F and F1) at the second reference position F is generated.

The autonomous navigation error correction processing unit 21 uniformly scales up or down and rotates the locus T2 indicated by a series of positional data sets obtained by the autonomous navigation position measurement such that first reference position E which is one end of the locus T2 is fixed and that the other end F1 is superposed on a position of the second reference position F where the GPS measurement is performed.

That is, the autonomous navigation error correction processing unit 21 superposes a straight line vector between the positions E and F1 on a straight line vector between the positions E and F.

The autonomous navigation error correction processing unit 21 sets, as positional data after correction, positional data of each measured position shifted on a locus T3 after this change.

However, when the straight line vector between the positions E and F1 is small with respect to a range of the locus T2, it becomes difficult for the autonomous navigation error correction processing unit 21 to obtain precise positional data, even if the correction processing is carried out, owing to an error between the first reference position E and the second reference position F or a cumulative error at the position F1.

On the other hand, according to the navigation apparatus 1 of the embodiment, as illustrated in FIGS. 2 and 3, the CPU 10 determines whether a measured position is moving toward the first reference position, while a series of positional data sets is obtained by the autonomous navigation position measurement.

If the CPU 10 determines that a measured position is moving toward the first reference position, the CPU 10 carries out the GPS measurement even when the elapsed time does not reach the predetermined time, the CPU 10 makes the autonomous navigation error correction processing unit 21 carry out the processing for correcting positional data and therefore, it is possible to avoid a situation where the precise correction processing is difficult as illustrated in FIG. 4.

[Control Procedure]

Next, control procedure for performing the positioning control processing will be described in detail.

Figure 5:
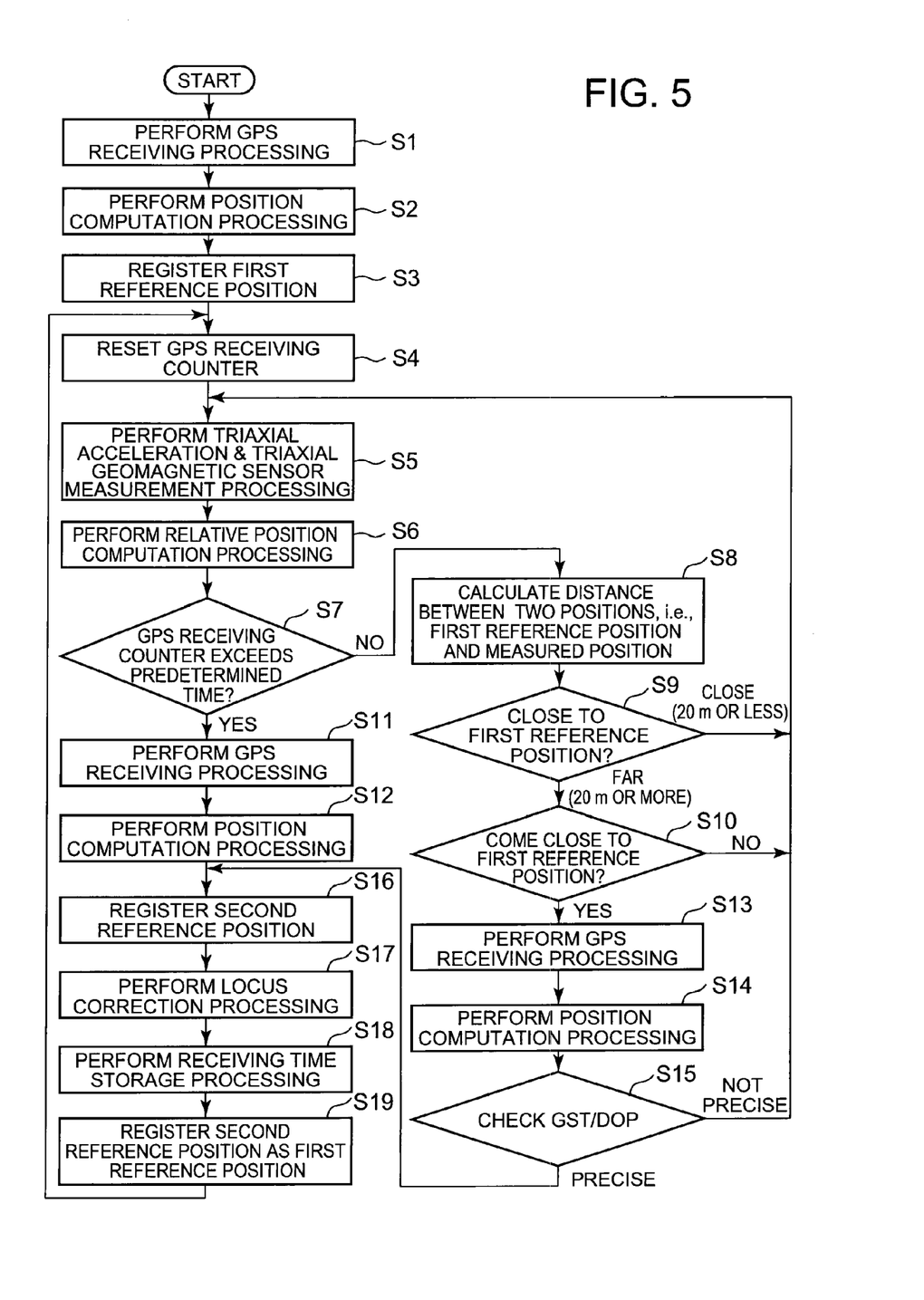
FIG. 5 is a flowchart illustrating a control procedure of positioning control processing of the first embodiment which is executed by a central processing unit (CPU)

FIG. 5 is a flowchart illustrating the control procedure of positioning control processing which is executed by the CPU.

This positioning control processing is started based on a command to start the positioning operation issued by power activation, a user's operation, or the like.

If the positioning control processing is started, the CPU 10 first operates the GPS receiving antenna 13 and the GPS reception unit 14 and makes them receive signals from the GPS satellites (step S1).

The GPS reception unit 14 carries out predetermined positioning computation based on the received signals, obtains positional data and outputs the same to the CPU 10.

The CPU 10 registers this positional data in the positional data storage unit 22 (step S2).

Further, the CPU 10 registers this positional data as positional data of the first reference position used for a subsequent autonomous navigation position measurement (step S3).

The positional data of the first reference position is sent to the autonomous navigation control processing unit 20, and used for computation processing for subsequent autonomous navigation position measurements.

Next, the CPU 10 shifts the processing to a processing loop (steps S4 to S19) for intermittently carrying out the GPS measurement while the CPU 10 continuously executes the autonomous navigation position measurement.

First, the CPU 10 resets a GPS receiving counter which counts elapsed time (step S4).

The CPU 10 samples detection output from the triaxial acceleration sensor 16 and the triaxial geomagnetic sensor 15 (step S5).

Then, the CPU 10 sends sample data to the autonomous navigation control processing unit 20 to make the unit 20 calculate positional data (step S6).

The CPU 10 stores the calculated positional data in the positional data storage unit 22 together with a correction flag which indicates that the positional data is not corrected.

Next, the CPU 10 determines whether a value of the GPS receiving counter exceeds predetermined time (step S7).

If the value of the GPS receiving counter does not exceed the predetermined time, the CPU 10 calculates a distance between two positions, i.e., between the first reference position and the presently-measured position (step S8: distance calculating unit).

The CPU 10 determines whether the presently-measured position is located within a range close to the first reference position (e.g., within 20 m) (step S9: prohibiting unit) based on the distance between two positions, and if the measured position is in the close range, the procedure is returned to step S5.

If the presently-measured position is not within the range close to the first reference position, the CPU 10 compares a series of the distances between two positions which have been calculated, and the CPU 10 determines whether the presently-measured position is moving toward the first reference position (step S10: positioning operation timing control unit).

As a result, if it is determined that the measured position is not moving toward the first reference position, the CPU 10 returns the processing step to step S5.

That is, when it is determined that the measured position is moving away from the first reference position, the autonomous navigation position measurement is continuously carried out until a predetermined time has elapsed since the last time GPS measurement, and positional data sets of the each position on the movement path are obtained in the processing loop of steps S5 to S10.

When it is determined that the measured position is not separated away from the first reference position by more than a predetermined distance (e.g., 20 m), the autonomous navigation position measurement is continuously carried out until the predetermined time has elapsed since the last time GPS measurement, and positional data sets of the positions on the movement path are obtained in the processing loop of steps S5 to S9.

While the above-described processing loop is repeatedly executed, if the predetermined time has elapsed since the last time GPS measurement, the CPU 10 shifts to "YES" in the determination processing in step S7, and goes out of the processing loop.

If the elapsed time reaches the predetermined time and the procedure goes out of the processing loop, the CPU 10 makes the GPS reception unit 14 receive signals from the GPS satellites (step S11), and carry out predetermined positioning computation, and thereby the CPU 10 obtains positional data (step S12).

The CPU 10 registers this positional data as positional data of the second reference position (step S16).

The CPU 10 issues a command for the autonomous navigation error correction processing unit 21 to make the unit 21 execute processing for correcting non-corrected positional data stored in the positional data storage unit 22 (step S17).

Here, the autonomous navigation error correction processing unit 21 corrects the positional data to more precise positional data based on the positional data sets of the first reference position and the second reference position obtained by an intermittent GPS measurement.

That is, the autonomous navigation error correction processing unit 21 carries out predetermined computation processing with respect to a series of positional data sets obtained by the autonomous navigation position measurement during the movement from the first reference position to the second reference position, and corrects the positional data to be more precise.

The original positional data in the positional data storage unit 22 is overwritten by the corrected positional data and the corrected positional data is stored in the positional data storage unit 22 together with a correction flag which indicates that the positional data is corrected.

Next, the CPU 10 makes the positional data storage unit 22 store a time when the GPS measurement in steps 13 and S14 is carried out (step S18).

The CPU 10 newly registers the positional data of the second reference position as positional data of the first reference position (step S19: reference position updating unit), and step to be processed is returned to step S4.

That is, when it is determined that the predetermined time has elapsed since the last time GPS measurement, the GPS measurement and the processing for correcting the positional data are executed by the processing in steps S11, S12 and S16 to S19.

Then, the CPU 10 returns step to be processed to step S4 and thereby, the time-counting operation by the GPS receiving counter is again started from zero.

While the above-described processing loop (steps S5 to S9 and S10) is repeatedly executed, if a distance between the measured position and the first reference position exceeds the predetermined distance (e.g., 20 m) and if it is determined that the measured position is moving toward the first reference position, step to be processed is shifted to "YES" in the determination processing in step S10 and the procedure goes out of the above-described processing loop.

If the measured position moves toward the measured position and the procedure goes out of the processing loop, the CPU 10 makes the GPS reception unit 14 receive signals from the GPS satellites through the GPS receiving antenna 13 (step S13).

The GPS reception unit 14 carries out predetermined positioning computation to obtain positional data, and outputs the same to the CPU 10.

The CPU 10 obtains this positional data (step S14).

Next, the CPU 10 obtains precision level for the GPS measurement and determines whether the position measurement precision is lower than a predetermined precision threshold value (step S15).

If the position measurement precision is lower than the precision threshold value, the CPU 10 does not use the positional data obtained by the GPS measurement in steps S13 and S14, and the procedure is returned to step S5.

If it is determined that the position measurement precision is higher than the precision threshold value in the determination processing in step S15, the CPU 10 uses the positional data obtained by the GPS measurement in steps S13 and S14. The CPU 10 executes the above-described processing in steps S16 to S19 (processing for correcting positional data and processing for updating first reference position).

Then, the CPU 10 returns step to be processed to step S4.

That is, by the processing in steps S13 to S19, the execution control of the intermittent GPS measurement based on a distance between two positions, i.e., between the first reference position and a measured position, and the processing for correcting a series of positional data sets based on the GPS measurement are carried out.

As described above, according to the navigation apparatus 1 of the first embodiment, if positional data is obtained by the autonomous navigation position measurement, the CPU 10 calculates a distance between two positions, i.e., between the first reference position and the measured position.

The CPU 10 determines whether the intermittent GPS measurement should be carried out based on this distance between two positions.

Therefore, the CPU 10 can carry out a GPS measurement under appropriate conditions as compared with a case where an intermittent GPS measurement is carried out only based on elapsed time.

More specifically, when it is determined that a measured position is moving toward the first reference position based on the distance between two positions, the CPU executes an intermittent GPS measurement.

Therefore, it is possible to avoid an inconvenience that the first reference position and the second reference position come so close to each other that the CPU 10 cannot precisely correct positional data when a series of positional data sets obtained by the autonomous navigation position measurement is corrected based on a result of the GPS measurement.

When the position obtained by the autonomous navigation position measurement is located within a predetermined distance range (e.g., within 20 m) from the first reference position, the navigation apparatus 1 of the first embodiment does not carry out the execution control of the GPS measurement based on the distance between two positions.

According to this, the navigation apparatus 1 can avoid a situation where although a measured position is moving in a range where a positioning error of the autonomous navigation position measurement is not increased so much, the GPS measurement or the correction processing is carried out unnecessarily.

Further, when the GPS measurement is carried out based on the distance between two positions, if the position measurement precision is lower than a predetermined precision threshold value, the navigation apparatus 1 of the first embodiment does not use this positional data.

Therefore, according to this navigation apparatus 1, positional data having poor position measurement precision is canceled and only positional data having high position measurement precision is used to carry out the processing for correcting positional data and the processing for updating a first reference position. A state where the GPS measurement is executed based on a distance between two positions means a state where time has elapsed since the last time GPS measurement does not yet reach the predetermined time and where no problem occurs even if the processing for updating a first reference position and the processing for correcting positional data are slightly delayed.

Therefore, in such a state, the navigation apparatus 1 does not use positional data having poor position measurement precision In this case, when positional data having good position measurement precision is obtained later, the navigation apparatus 1 uses this positional data Therefore, it is possible to obtain more precise positional data on the whole.

Second Embodiment

A navigation apparatus 1 of a second embodiment is different from that of the first embodiment in contents of the positioning control processing and other portions are the same as those of the first embodiment.

Therefore, different portions will be described.

Figure 6:
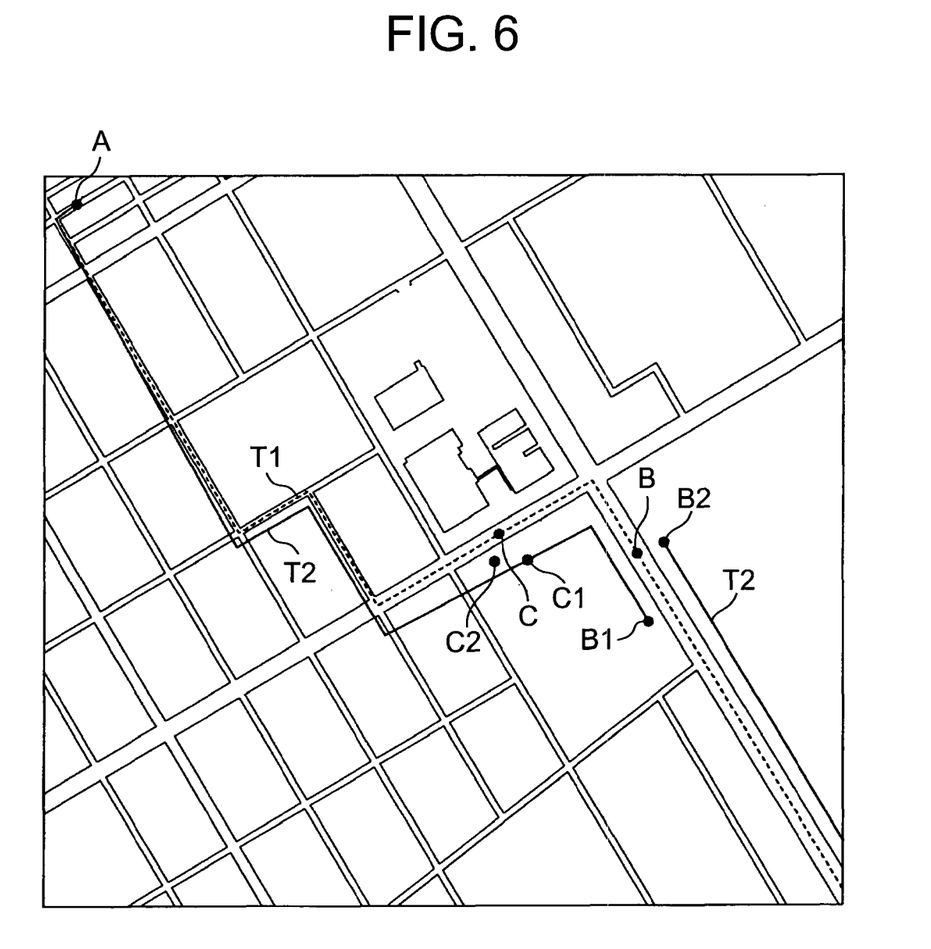
FIG. 6 is an explanatory diagram illustrating an example of a positioning result in positioning control processing according to a second embodiment.

FIG. 6 is an explanatory diagram illustrating an example of a positioning result in positioning control processing according to the second embodiment.

In FIG. 6, a broken line indicates an actual movement path T1 and a solid line indicates a locus T2 obtained by a result of an autonomous navigation position measurement.

In the positioning control processing of the second embodiment, as a basic operation, the CPU 10 makes the GPS reception unit 14 intermittently execute a GPS measurement based on elapsed time.

If the GPS measurement is newly carried out, the CPU 10 registers a position where the last time GPS measurement is carried out as a first reference position, and registers a position where a current GPS measurement is carried out as a second reference position.

The autonomous navigation error correction processing unit 21 carries out processing for correcting a series of positional data sets obtained by the autonomous navigation position measurement from the first reference position to the second reference position.

After the correction processing, the position which is registered as the second reference position is newly registered as a first reference position by the CPU 10, and the CPU 10 executes a subsequent autonomous navigation position measurement.

Further, in the positioning control processing of the second embodiment, while the autonomous navigation position measurement is continuously executed, the CPU 10 calculates a distance between two positions, i.e., between the first reference position and a presently-measured position.

Then, it is determined whether the distance between two positions exceeds a predetermined distance threshold value D (e.g., 500 min an initial state), and if the distance between two positions exceeds the distance threshold value D, the CPU 10 makes the GPS reception unit 14 execute an intermittent GPS measurement even if elapsed time does not reach the predetermined time.

Here, an initial value of the distance threshold value D is set to such a length that an error of an autonomous navigation position measurement starts to be prominent.

When a distance between two positions exceeds the distance threshold value D and the GPS measurement is executed, the processing for correcting positional data and the processing for updating a first reference position are executed.

When precision level representing precision of a positioning result is obtained in the GPS measurement and if the position measurement precision is lower than a predetermined precision threshold value H, the CPU 10 does not use a result of this GPS measurement and carries out processing in the same manner as a case where the GPS measurement is not carried out.

In this case, the CPU 10 also carries out processing to increase the distance threshold value D by a predetermined distance (e.g., 50 m), and processing to reduce the precision threshold value H by predetermined stages.

The purpose of increasing the distance threshold value D is to avoid a situation where the distance between two positions again exceeds the distance threshold value D by continuous movement and the GPS measurement is immediately carried out without time intervals.

The reason why the precision threshold value H is reduced by the predetermined stages is as follows.

That is, when a GPS measurement is carried out with a distance between two positions exceeding the distance threshold value D, a positioning error which is accumulated in the autonomous navigation position measurement is also increased, since the distance threshold value D is increased Hence, even if position measurement precision of the GPS measurement is slightly lower, it is effective to reset the positioning error of the autonomous navigation position measurement using the result of the GPS measurement.

Therefore, the CPU 10 reduces the precision threshold value H by the predetermined stages in accordance with the increase in the distance threshold value D.

According to the positioning control processing, as illustrated in FIG. 6, for example, the GPS measurement is first carried out at a start position and this position is set as a first reference position A.

Next, the autonomous navigation position measurement is continuously carried out and positional data of each position of the positioning locus T2 is obtained.

Errors between the positioning locus T2 and the actual movement path T1 are gradually increased.

When a measured position reaches a position C1 where a distance between two positions, i.e., between the first reference position A and the measured position exceeds an initial distance threshold value D (e.g., 500 m) before a predetermined time has elapsed since the GPS measurement at the first reference position A, the GPS measurement is carried out.

This position C1 corresponds to positional data obtained by the autonomous navigation position measurement when the navigation apparatus 1 is actually located at the point C.

Here, a case is assumed where a position obtained by the GPS measurement is a position C2 and position measurement precision obtained by signals of the GPS satellites is lower than the precision threshold value H.

In this case, the CPU 10 increases the distance threshold value D by a predetermined amount (e.g., 50 m) and reduces the precision threshold value H by the predetermined stages without using the result of the GPS measurement.

When a measured position reaches a position B1 where the distance between two positions, i.e., between the first reference position A and the measured position exceeds an updated distance threshold value D (e.g., 550 m) before a predetermined time has elapsed since the GPS measurement at the first reference position A, the GPS measurement is carried out.

This position B1 corresponds to positional data obtained by the autonomous navigation position measurement when the navigation apparatus 1 is actually located at the position B.

Here, a case is assumed where a position obtained by the GPS measurement is a position B2 and position measurement precision obtained by the GPS measurement is higher than the updated precision threshold value H.

If the position measurement precision is higher than the precision threshold value H, the CPU 10 uses a result of this GPS measurement and sets this position to the second reference position B2.

The CPU 10 carries out the processing for correcting a series of positional data sets obtained by the autonomous navigation position measurement performed from the first reference position A to the second reference position B2.

Thereafter, the CPU 10 sets this position B2 as a new first reference position and carries out a subsequent autonomous navigation position measurement.

Next, control procedure for performing the positioning control processing will be described in detail.

Figure 7:
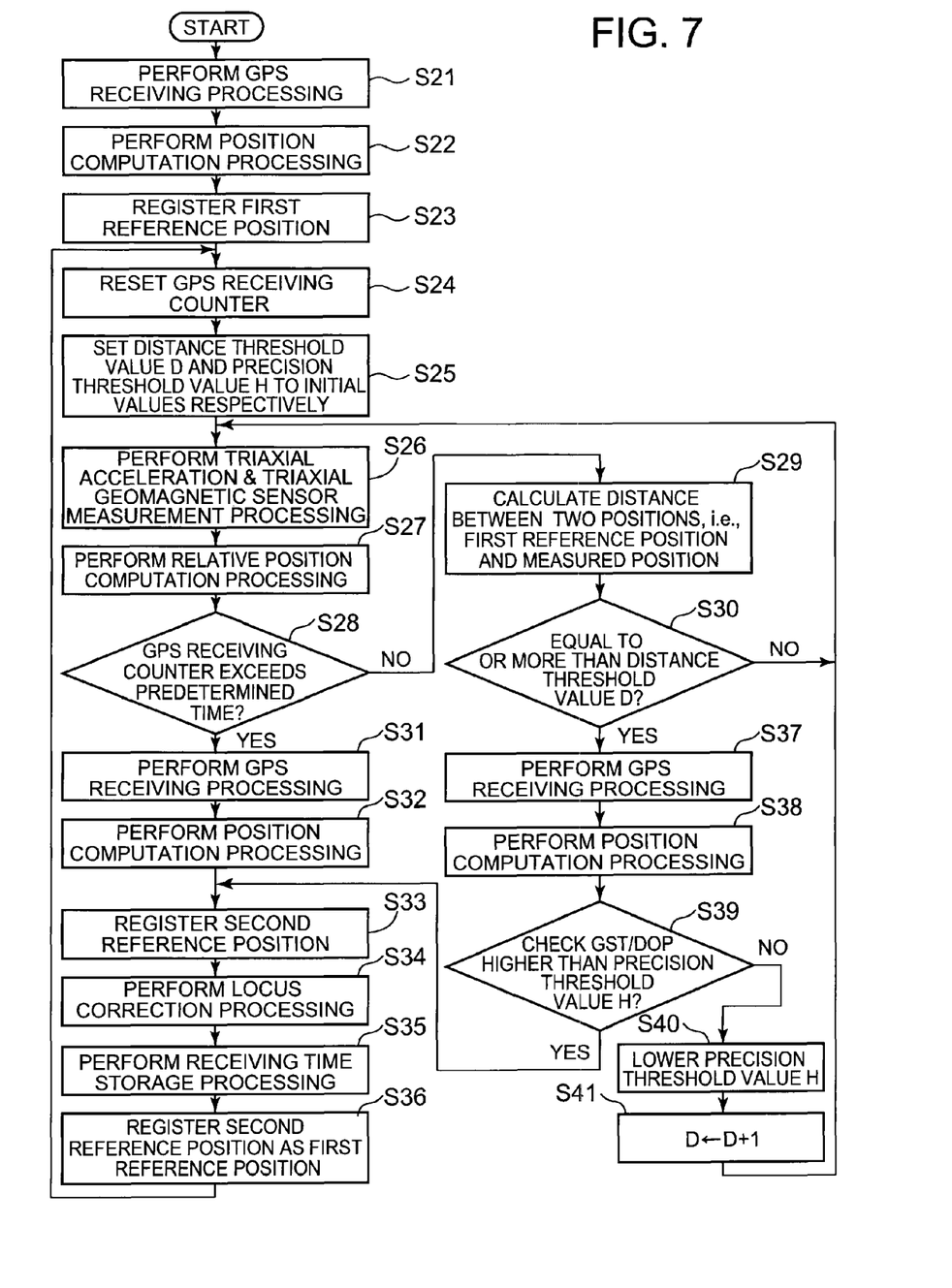
FIG. 7 is a flowchart illustrating a control procedure of positioning control processing of the second embodiment which is executed by the CPU.

FIG. 7 is a flowchart of the positioning control processing of the second embodiment which is executed by the CPU 10.

If the positioning control processing of the second embodiment is started, the CPU 10 first makes the GPS reception unit 14 receive signals from GPS satellites (step S21).

The GPS reception unit 14 carries out predetermined positioning computation based on the received signals to obtain positional data, and outputs the same to the CPU 10.

The CPU 10 obtains this positional data (step S22).

The CPU 10 registers this positional data as positional data of a first reference position (step S23).

Next, the CPU 10 resets a GPS receiving counter which counts elapsed time (step S24).

The CPU 10 resets a distance threshold value D and a precision threshold value H to initial values, respectively The distance threshold value D is a threshold value of a distance between two positions for receiving GPS signals The precision threshold value H is a threshold value of position measurement precision for determining whether to use a result of a GPS measurement for correcting positional data based on the distance between two positions (step S25).

Next, the CPU 10 samples detection outputs from the triaxial acceleration sensor 16 and the triaxial geomagnetic sensor 15 (step S26).

The CPU 10 sends these sampling data sets to the autonomous navigation control processing unit 20 and makes the unit 20 calculate positional data (step S27).

Next, the CPU 10 determines whether a value of the GPS receiving counter exceeds a predetermined time (step S28).

If the value of the GPS receiving counter does not yet exceed the predetermined time, the CPU 10 calculates a distance between two positions, i.e., between the first reference position and the presently-measured position (step S29: distance calculating unit).

Then, the CPU 10 compares the distance between two positions and the distance threshold value D with each other, and determines whether the former distance exceeds the latter distance (step S30: positioning timing control unit).

As a result, if the distance between two positions is shorter than the distance threshold value D, the CPU 10 returns step to be processed to step S26.

That is, time which has elapsed since the last time GPS reception is checked and the distance between two positions is checked while the autonomous navigation position measurement is continuously executed in the processing loop in steps S26 to S30 and in this state.

If the predetermined time has elapsed since the last time GPS reception while the processing loop (steps S26 to S30) is repeatedly executed, step to be processed is shifted to "YES" in the determination processing in step 28, and the procedure goes out of the processing loop.

If the predetermined time has elapsed and the procedure goes out of the processing loop, the CPU 10 first makes the GPS reception unit 14 receive signals from the GPS satellites (step S31), and carry out predetermined positioning computation.

The GPS reception unit 14 carries out the predetermined positioning computation based on the received signals to obtain positional data, and outputs the same to the CPU 10.

The CPU 10 obtains the positional data (step S32).

The CPU 10 registers this positional data as positional data of the second reference position (step S33).

Next, the CPU 10 issues a command to the autonomous navigation error correction processing unit 21 and makes the unit 21 execute the processing for correcting non-corrected positional data stored in the positional data storage unit 22 (step S34).

Next, the CPU 10 makes the positional data storage unit 22 store a time when a GPS measurement is carried out (step S35).

The CPU 10 newly registers the positional data of the second reference position as positional data of a new first reference position (step S36: reference position updating unit).

Thereafter, the CPU 10 returns step to be processed to step S24.

If the distance between two positions is equal to or more than the distance threshold value D while the processing loop (steps S26 to S30) is repeatedly executed, step to be processed is shifted to "YES" in the determination processing in step S30 and the procedure goes out of the processing loop.

If the distance between two positions is equal to or more than the distance threshold value D and the procedure goes out of the processing loop, the CPU 10 first makes the GPS reception unit 14 receive signals from the GPS satellites (step S37).

The GPS reception unit 14 carries out predetermined positioning computation based on the received signals to obtain positional data, and outputs the same to the CPU 10.

The CPU 10 obtains the positional data (step S38).

Next, the CPU 10 checks precision level for the GPS measurement, and determines whether the position measurement precision is higher than the precision threshold value H (step S39).

If the position measurement precision is lower than the precision threshold value H, the CPU 10 does not use the positional data obtained by the GPS measurement in steps S37 and S38 and cancels the positional data.

The CPU 10 reduces the precision threshold value H by predetermined stages (step S40: threshold value updating unit).

The CPU 10 updates the distance threshold value D into a value obtained by adding a predetermined amount α to the distance threshold value D (step S41: threshold value updating unit). The CPU 10 returns step to be processed to step S26.

If the CPU 10 determines in the determination processing in step S39 that the position measurement precision is higher than the precision threshold value H, the CPU 10 makes step to be processed jump to step S33.

The CPU 10 carries out processing for correcting a series of positional data sets obtained by the autonomous navigation position measurement and carries out processing for updating the first reference position by using positional data obtained by the GPS measurement in steps S37 and S38.

As described above, if positional data is obtained by the autonomous navigation position measurement, the navigation apparatus 1 of the second embodiment calculates a distance between two positions, i.e., between the first reference position and the measured position, and determines whether to carry out an intermittent GPS measurement based on this distance between two positions.

Therefore, the navigation apparatus 1 can carry out a GPS measurement under more appropriate conditions as compared with a case where the intermittent GPS measurement is carried out based on only elapsed time.

More specifically, when the distance between two positions is equal to or more than the distance threshold value D in which case an error of an autonomous navigation position measurement increases, the intermittent GPS measurement is carried out.

Therefore, when the measured position is moved a long distance before the elapsed time reaches the predetermined time, the navigation apparatus 1 carries out the GPS measurement before cumulative errors of the autonomous navigation position measurement are increased.

According to this, the navigation apparatus 1 can reset the cumulative errors of the autonomous navigation position measurement.

Further, according to the navigation apparatus 1, when the measured position is not to be moved a long distance, an interval of time between the intermittent GPS measurements is set long, for example, so that the GPS measurement is not carried out during the interval.

According to this, the navigation apparatus 1 can avoid an inconvenience that although cumulative errors of the autonomous navigation position measurement are not increased so much, the GPS measurement is carried out unnecessarily and electric power is wasted.

According to the navigation apparatus 1 of the second embodiment, when a GPS measurement is carried out based on the distance between two positions, and if the position measurement precision of positional data is lower than a predetermined precision threshold value H, this positional data is not used.

Therefore, the navigation apparatus 1 cancels positional data having poor position measurement precision, and thereby, carries out the processing for correcting positional data and the processing for updating a first reference position by using only positional data having high position measurement precision.

Further, when the navigation apparatus 1 carries out the GPS measurement based on a distance between two positions, and if the position measurement precision of the positional data is poor, the navigation apparatus 1 increases the distance threshold value D, and reduces the precision threshold value H by the predetermined stages.

Therefore, the navigation apparatus 1 can avoid a situation where a GPS measurement is immediately carried out during subsequent movement in a moving-away direction As a result, the GPS measurement is carried out after the navigation apparatus 1 moves over an appropriate distance.

At this time, since a distance from the first reference position is increased, the navigation apparatus 1 can correspondingly lower a threshold value for position measurement precision based on which it is determined whether to employ a result of the GPS measurement.

The present invention is not limited to the above-mentioned embodiments, but various modifications are possible.

For example, according to the embodiments, the navigation apparatus 1 obtains a distance between two positions, i.e., between the first reference position and the measured position whenever positional data is obtained by the autonomous navigation position measurement.

Alternatively, the navigation apparatus 1 may reduce the number of times of calculating the distance For example, a distance between two positions may be obtained one time for a plurality of autonomous navigation position measurements.

Further, in the navigation apparatus 1 of the embodiments, the GPS satellites are used as positioning satellites, but other positioning satellites may be used.

Still further, a method of calculating a relative moving direction and a moving amount in the autonomous navigation position measurement is not limited to those of the embodiments.

For example, if the navigation apparatus 1 can be attached to a user's body with a predetermined orientation, it is possible to judge a forward direction of the user as a moving direction using a biaxial direction sensor.

If the navigation apparatus 1 is used in or on a vehicle, it is possible to measure a moving direction using a gyro sensor, and to detect the number of revolutions of a tire to measure a moving amount.

The method of the processing for correcting positional data of the autonomous navigation position measurement is not limited to those shown in the embodiments, and various methods can be employed.

Details of the navigation apparatus 1 shown in the embodiments can appropriately be changed within a range not departing from a subject matter of the invention.

The entire disclosures of Japanese Patent Application No. 2010-206246 filed on Sep. 15, 2010 and Japanese Patent Application No. 2010-249325 filed on Nov. 8, 2010 including description, claims, drawings, and abstract are incorporated herein by reference in its entirety.

Although various exemplary embodiments have been shown and described, the invention is not limited to the embodiments shown Therefore, the scope of the invention is intended to be limited solely by the scope of the claims that follow.

What is claimed is:

1. A positioning apparatus comprising:
   a first positioning unit which intermittently receives signals from a plurality of positioning satellites to obtain positional information of a reference position;
   a second positioning unit which obtains a present position by continuously calculating a moving direction and a moving amount of the positioning apparatus, and by adding information of the moving direction and the moving amount to the positional information of the reference position;
   a reference position updating unit which updates the positional information of the reference position by causing the first positioning unit to newly obtain positional information of the reference position;
   a count unit which counts an elapsed period of time each time after the reference position updating unit updates the positional information of the reference position;
   a distance calculating unit which calculates a distance between a last-obtained reference position and a present position obtained by the second positioning unit, each time the second positioning unit obtains a predetermined number of present positions;
   a distance judging unit which judges whether a currently-calculated distance calculated by the distance calculating unit is longer than a predetermined distance and shorter than a last-calculated distance calculated by the distance calculating unit; and a positioning timing control unit which controls a timing when the reference position updating unit updates the positional information of the reference position so as to cause the reference position updating unit to update the positional information of the reference position when it is determined that the elapsed period of time counted by the count unit exceeds a predetermined amount of time, or when the distance judging unit judges that the currently-calculated distance is longer than the predetermined distance and shorter than the last-calculated distance.

2. The positioning apparatus according to claim 1, wherein the second positioning unit obtains a series of present positions, the distance calculating unit calculates a series of distances between the last-obtained reference position and the respective positions of the series of present positions obtained by the second positioning unit, and the distance judging unit judges whether the currently-calculated distance is longer than the predetermined distance and shorter than the last-calculated distance based on the series of distances calculated by the distance calculating unit.

3. The positioning apparatus according to claim 2, further comprising a prohibiting unit which prohibits the first positioning unit from newly obtaining positional information when the elapsed period of time counted by the counting unit has not exceeded the predetermined amount of time and the distance judging unit judges that the distance calculated by the distance calculating unit is shorter than the predetermined distance.

4. The positioning apparatus according to claim 2, further comprising a correcting unit which corrects a series of positional information sets corresponding to the series of present positions obtained by the second positioning unit, based on the newly-obtained positional information of the reference position, when the positional information of the reference position is updated.

5. The positioning apparatus according to claim 2, further comprising a precision level obtaining unit which obtains a precision level representing a position measurement precision of the first positioning unit at a time when the first positioning unit obtains positional information, wherein the positional information obtained by the first positioning unit is not used when the position measurement precision is lower than a predetermined precision threshold value.

6. The positioning apparatus according to claim 1, further comprising a prohibiting unit which prohibits the first positioning unit from newly obtaining positional information when the elapsed period of time counted by the counting unit has not exceeded the predetermined amount of time and the distance judging unit judges that the distance calculated by the distance calculating unit is shorter than the predetermined distance.

7. The positioning apparatus according to claim 1, further comprising a precision level obtaining unit which obtains a precision level representing a position measurement precision of the first positioning unit at a time when the first positioning unit obtains positional information, wherein the positional information obtained by the first positioning unit is not used when the position measurement precision is lower than a predetermined precision threshold value.

8. A positioning method for a positioning apparatus comprising a first positioning unit and a second positioning unit, the first positioning unit intermittently receiving signals from a plurality of positioning satellites to obtain positional information of a reference position, and the second positioning unit obtaining a present position by continuously measuring a moving direction and a moving amount of the positioning apparatus, and by adding information of the moving direction and the moving amount to the positional information of the reference position, the method comprising:

obtaining positional information of the reference position with the first positioning unit, and obtaining a present position with the second positioning unit;

updating the positional information of the reference position by causing the first positioning unit to newly obtain positional information of the reference position;

counting an elapsed period of time each time after the positional information of the reference position is updated;

calculating a distance between a last-obtained reference position and a present position obtained by the second positioning unit, each time a predetermined number of present positions is obtained with the second positioning unit;

judging whether a currently-calculated distance is longer than a predetermined distance and shorter than a last-calculated distance; and controlling a timing of updating the positional information of the reference position such that the positional information of the reference position is updated when it is determined that the counted elapsed period of time exceeds a predetermined amount of time, or when it is judged that the currently-calculated distance is longer than the predetermined distance and shorter than the last-calculated distance.

9. The positioning method according to claim 8, wherein:

a series of present positions are obtained by the second positioning unit, a series of distances are calculated between the last-obtained reference position and the respective positions of the series of present positions obtained by the second positioning unit, and it is judged whether the currently-calculated distance is longer than the predetermined distance and shorter than the last-calculated distance based on the series of calculated distances.

10. A non-transitory computer readable storage medium having recorded thereon a computer program for controlling a computer which communicates with a positioning apparatus comprising a first positioning unit and a second positioning unit, the first positioning unit intermittently receiving signals from a plurality of positioning satellites to obtain positional information of a reference position, and the second positioning unit obtaining a present position by continuously measuring a moving direction and a moving amount of the positioning apparatus and by adding information of the moving direction and the moving amount to the positional information of the reference position;

wherein the program controls the computer to cause the first positioning unit to obtain positional information of the reference position, and to cause the second positioning unit to obtain a present position; and wherein the program controls the computer to function as:

a reference position updating unit which updates the positional information of the reference position by causing the first positioning unit to newly obtain positional information of the reference position;

a count unit which counts an elapsed period of time each time after the reference position updating unit updates the positional information of the reference position;

a distance calculating unit which calculates a distance between a last-obtained reference position and a present position obtained by the second positioning unit, each time the second positioning unit obtains a predetermined number of present positions;

a distance judging unit which judges whether a currently-calculated distance calculated by the distance calculating unit is longer than a predetermined distance and shorter than a last-calculated distance calculated by the distance calculating unit; and a positioning timing control unit which controls a timing when the reference position updating unit updates the positional information of the reference position so as to cause the reference position updating unit to update the positional information of the reference position when it is determined that the elapsed period of time counted by the count unit exceeds a predetermined amount of time, or when the distance judging unit judges that the currently-calculated distance is longer than the predetermined distance and shorter than the last-calculated distance.

11. The storage medium storing the program according to claim 10, wherein the program further controls the computer so that:

the second positioning unit obtains a series of present positions, the distance calculating unit calculates a series of distances between the last-obtained reference position and the respective positions of the series of present positions obtained by the second positioning unit, and the distance judging unit judges whether the currently-calculated distance is longer than the predetermined distance and shorter than the last-calculated distance based on the series of distances calculated by the distance calculating unit.

* * * * *